US008336925B2

(12) United States Patent
Paquet et al.

(10) Patent No.: US 8,336,925 B2
(45) Date of Patent: Dec. 25, 2012

(54) VENTILATION DUCT ASSEMBLY KIT AND METHOD OF ASSEMBLY USING THE SAME

(75) Inventors: André Paquet, Rouyn-Noranda (CA); Cristian Paquet, Rouyn-Noranda (CA)

(73) Assignee: Mecanincad Inc., Rouyn-Noranda (Quebec) (CA)

( * ) Notice: Subject to any disclaimer, the term of this patent is extended or adjusted under 35 U.S.C. 154(b) by 435 days.

(21) Appl. No.: 12/550,702

(22) Filed: Aug. 31, 2009

(65) Prior Publication Data
US 2010/0194105 A1    Aug. 5, 2010

Related U.S. Application Data

(60) Provisional application No. 61/149,846, filed on Feb. 4, 2009.

(51) Int. Cl.
*F16L 11/00* (2006.01)
(52) U.S. Cl. ........ 285/419; 138/128; 138/158; 138/166; 193/25 R
(58) Field of Classification Search .......... 285/419, 285/373; 193/25 R, 25 E, 25 A; 138/128, 138/135, 158, 166
See application file for complete search history.

(56) References Cited

U.S. PATENT DOCUMENTS

| | | | | |
|---|---|---|---|---|
| 3,517,702 A | * | 6/1970 | Trimble et al. | 138/128 |
| 4,023,374 A | * | 5/1977 | Colbert et al. | 138/159 |
| 4,366,011 A | * | 12/1982 | Nolf | 285/419 |
| 4,714,280 A | * | 12/1987 | Winterhoff | 138/166 |
| 4,860,799 A | * | 8/1989 | Van Noten | 138/128 |
| 4,865,893 A | * | 9/1989 | Kunze et al. | 138/128 |
| 4,900,596 A | * | 2/1990 | Peacock | 138/128 |
| 4,967,800 A | * | 11/1990 | Heilmayr et al. | 138/128 |
| 5,022,685 A | * | 6/1991 | Stiskin et al. | 138/166 |
| 5,300,732 A | * | 4/1994 | Wambeke et al. | 138/128 |
| 5,375,967 A | | 12/1994 | Rathert | |
| 5,472,768 A | * | 12/1995 | Anson | 138/168 |
| 5,505,230 A | * | 4/1996 | Bartholomew | 138/166 |
| 5,540,255 A | * | 7/1996 | Trueb et al. | 138/158 |
| 5,560,618 A | | 10/1996 | Wambeke et al. | |
| 5,733,614 A | * | 3/1998 | Stieb | 138/128 |
| 6,904,941 B2 | * | 6/2005 | Howard | 138/168 |
| 7,100,633 B2 | * | 9/2006 | Lechuga | 138/158 |

OTHER PUBLICATIONS

Mine and Tunnel Ventilation, ABC Ventilation Systems, Corporate Overview Brochure. http://www.abcventillation.com/literature/en_mtv.pdf, accessed on Jan. 6, 2010.

* cited by examiner

*Primary Examiner* — David E Bochna
(74) *Attorney, Agent, or Firm* — Fish & Richardson P.C.

(57) ABSTRACT

A ventilation duct assembly kit for use for forming interconnecting ventilation ducts. The kit includes a pallet supporting a flexible panels that are shapeable into ductwork elements. Each of the panels has opposite duct-forming sides, opposite interconnecting sides for interconnection to a subsequent panel formed into a ductwork element, and a male and female interlocking interfaces respectively fixed on first and second opposite duct-forming sides for interlocking of the duct-forming sides together. The kit also includes slideable locking elements shaped to slide and fit over assembled male and female interlocking interfaces. A plurality of collets shaped to fit over the interconnecting sides of the formed ductwork elements and sized to extend between the adjacent slideable locking elements from corresponding adjacent shaped ductwork elements that are linked through the collet are also provided. A method of assembling such interconnecting ventilation ducts is also disclosed.

10 Claims, 11 Drawing Sheets

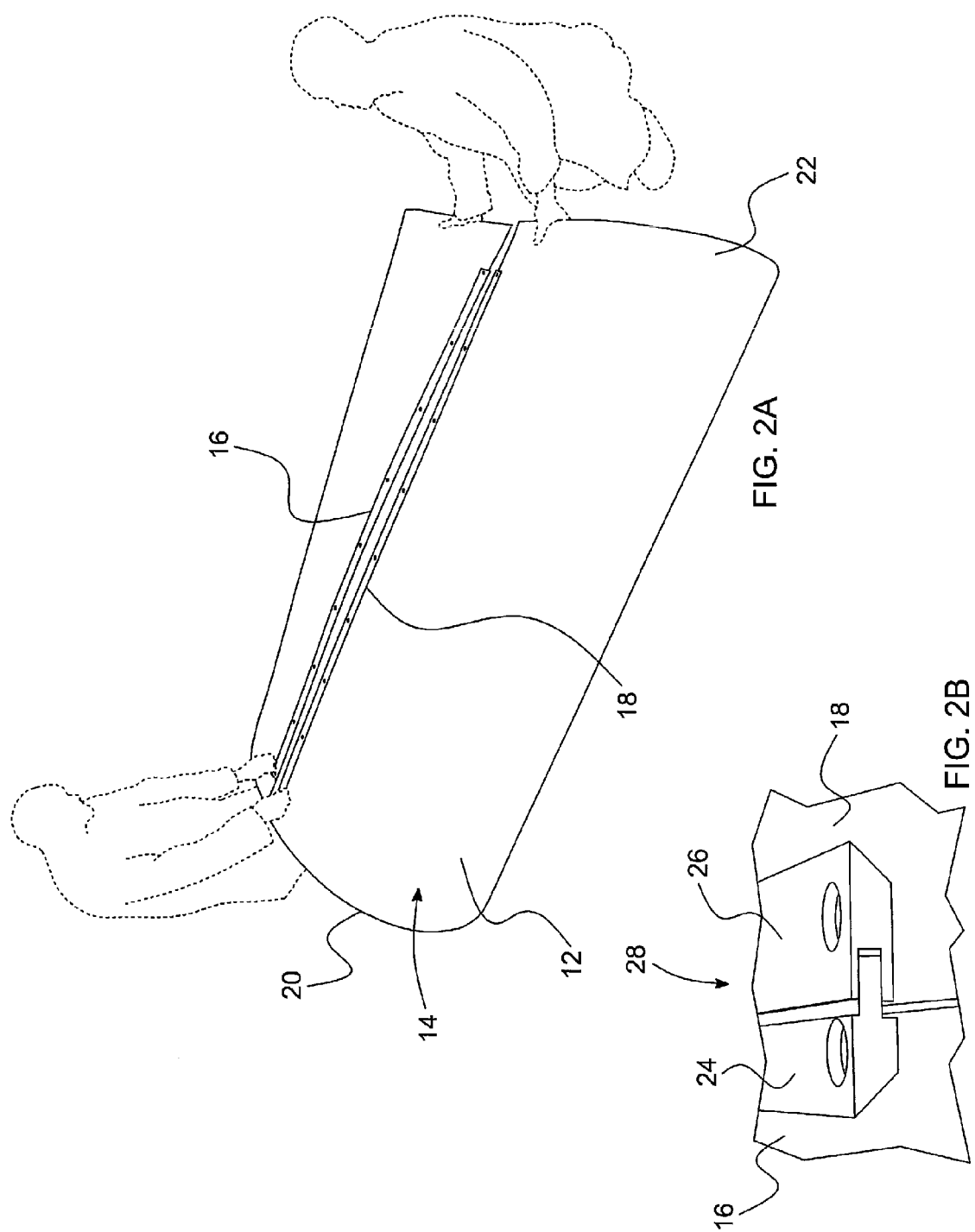

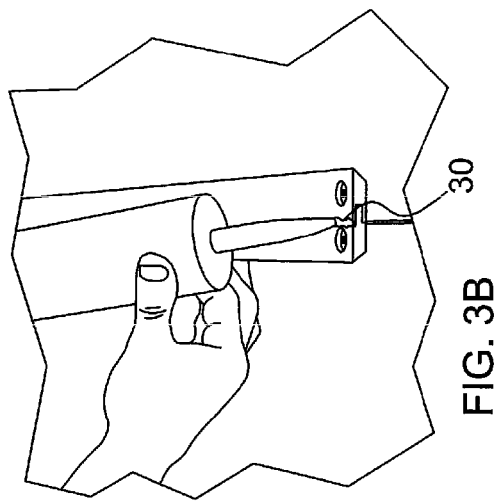
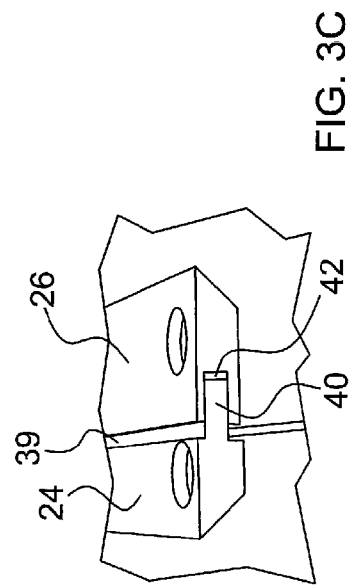
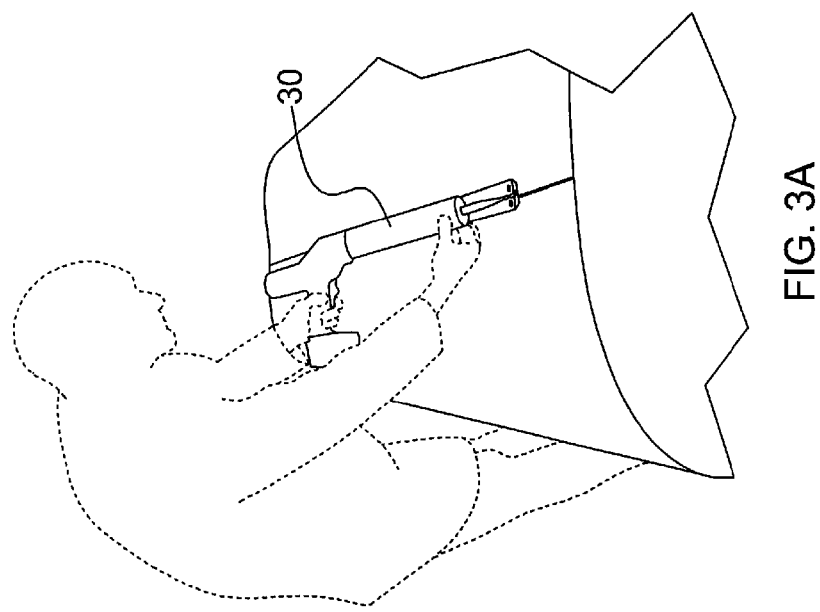
FIG. 3B
FIG. 3C
FIG. 3A

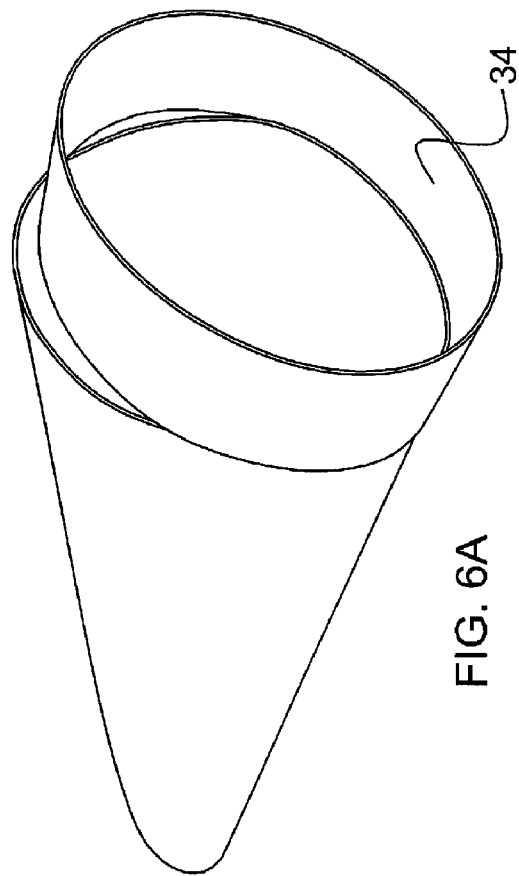
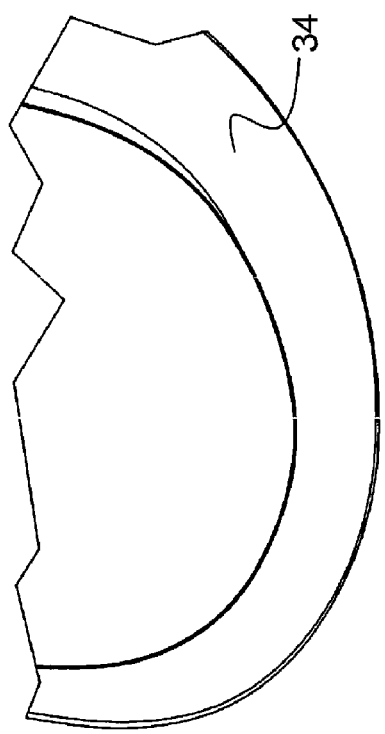
FIG. 6A
FIG. 6B

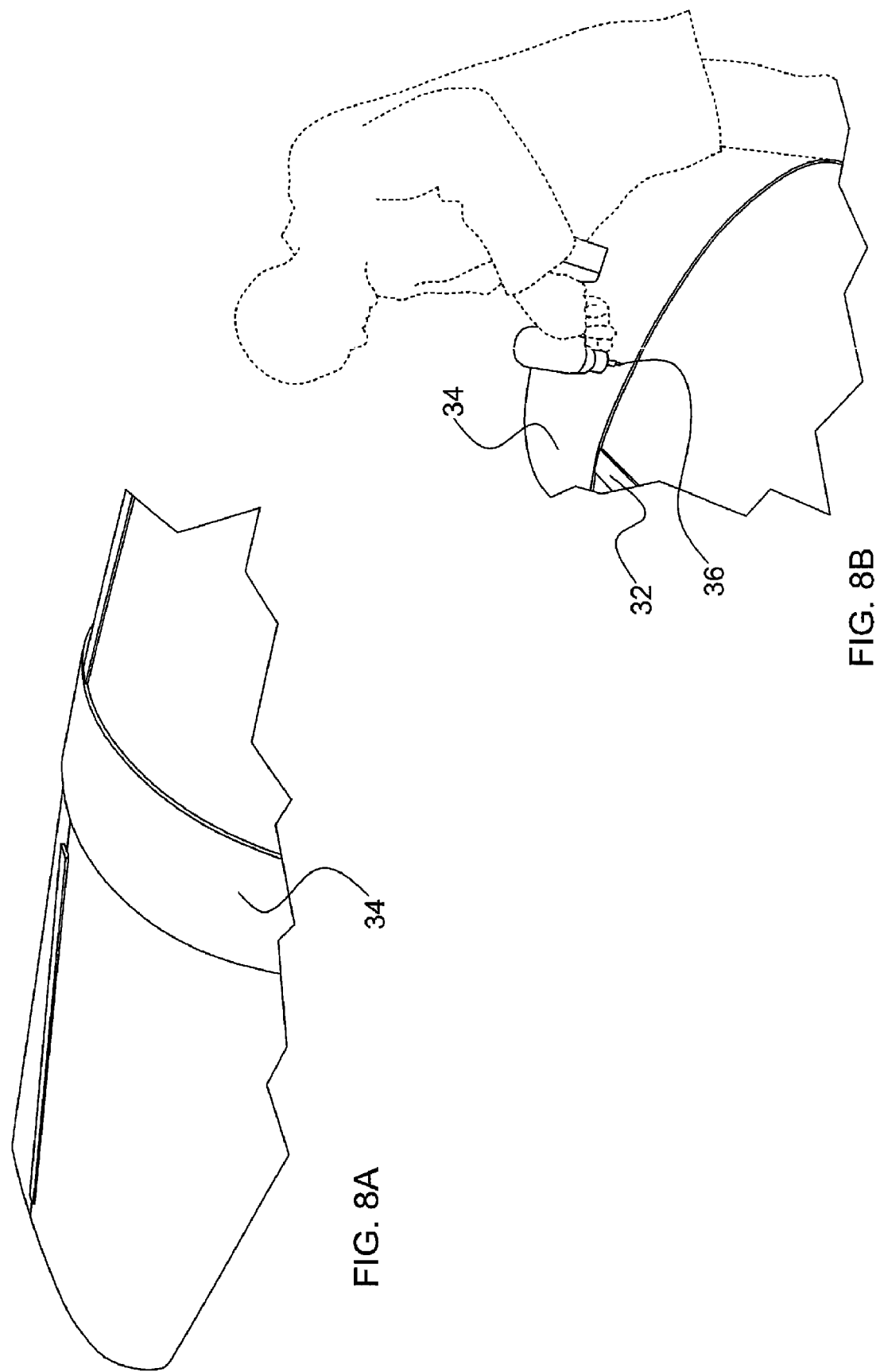

VENTILATION DUCT ASSEMBLY KIT AND METHOD OF ASSEMBLY USING THE SAME

FIELD OF THE INVENTION

The present invention generally relates to ventilation systems. More particularly, the present invention relates to a ventilation duct assembly kit for use for forming interconnecting ventilation ducts, and a method of assembling such interconnecting ventilation ducts.

BACKGROUND OF THE INVENTION

This invention relates to a ventilation duct assembly kit for use for forming interconnecting ventilation ducts in underground passages such as mines and tunnels.

One type of ducting known to the Applicant is the ABC MineVent™ high pressure ventilation ducting, used to supply positive pressure ventilation for mines and tunnels. MineVent™ is produced in standard diameters from 300 mm to 3050 mm (12"-120") in section lengths up to 500 meters (1640').

However, there is still presently a need for a ventilation duct assembly kit for use for forming interconnecting ventilation ducts that is easily transportable underground in smaller section lengths and easy to assemble onsite.

SUMMARY OF THE INVENTION

An object of the present invention is to provide a ventilation duct assembly kit that satisfies the above mentioned need.

Accordingly, the present invention provides a ventilation duct assembly kit for use for forming interconnecting ventilation ducts, the kit comprising:
   a pallet supporting a plurality of stacked flat flexible panels that are shapeable into ductwork elements, each of said flexible panels comprising:
      first and second opposite duct-forming sides;
      first and second opposite interconnecting sides for interconnection to a subsequent panel formed into a ductwork element; and
      a male interlocking interface and a corresponding female interlocking interface of a fastening system respectively fixed on the first and second opposite duct-forming sides for interlocking of the duct-forming sides together upon shaping of the ductwork element;
   sealant for sealing of the male and female interlocking interfaces after shaping of the ductwork element;
   a plurality of slideable locking elements shaped to slide and fit over assembled male and female interlocking interfaces after shaping of the ductwork element;
   a plurality of collets shaped to fit over the interconnecting sides of the formed ductwork elements for interconnection of adjacent shaped ductwork elements, and sized to extend between the adjacent slideable locking elements from corresponding adjacent shaped ductwork elements; and
   a plurality of fasteners for fastening the collets to the shaped ductwork elements.

The present invention also provides a method for assembling interconnecting ventilation ducts, the method comprising the steps of:
   a) providing a ventilation duct assembly kit, the kit comprising:
      a pallet supporting a plurality of stacked flat flexible panels that are shapeable into ductwork elements, each of said flexible panels comprising:
         first and second opposite duct-forming sides;
         first and second opposite interconnecting sides for interconnection to a subsequent panel formed into a ductwork element; and
         a male interlocking interface and a corresponding female interlocking interface of a fastening system respectively fixed on the first and second opposite duct-forming sides for interlocking of the duct-forming sides together upon shaping of the ductwork element;
      sealant for sealing of the male and female interlocking interfaces after shaping of the ductwork element;
      a plurality of slideable locking elements shaped to slide and fit over assembled male and female interlocking interfaces after shaping of the ductwork element;
      a plurality of collets shaped to fit over the interconnecting sides of the formed ductwork elements for interconnection of adjacent shaped ductwork elements, and sized to extend between the adjacent slideable locking elements from corresponding adjacent shaped ductwork elements; and
      a plurality of fasteners for fastening the collets to the shaped ductwork elements.
   b) taking a flat flexible panel and placing the male interlocking interface of said panel into the corresponding female interlocking interface to form the ductwork element;
   c) sealing an interface between the assembled male interlocking interface and the corresponding female interlocking interface with the sealant;
   d) sliding a slideable locking element over the assembled male and female interlocking interfaces;
   e) sealing the extremities of the slideable locking elements placed over the assembled male and female interlocking interfaces with the sealant;
   f) inserting a collet over an interconnecting side of the formed ductwork element until it contacts the slideable locking element;
   g) inserting the collet over an interconnecting side of an adjacent formed ductwork element until it contacts the slideable locking element of said adjacent formed ductwork element to interconnect the adjacent formed ductwork elements; and
   h) fastening the collet to the adjacent formed ductwork elements with fasteners.

Preferably, before steps f) and g), sealant is applied to the interconnecting sides of the formed ductwork elements to properly seal the joint.

BRIEF DESCRIPTION OF THE DRAWINGS

These and other objects and advantages of the invention will become apparent upon reading the detailed description and upon referring to the drawings in which:

FIGS. 2A and 2B are perspective and detailed views respectively of a shaped ductwork element and the associated interface between the assembled male and female interlocking interfaces according to a preferred embodiment of the present invention;

FIGS. 3A to 3C are perspective views illustrating a sealing step of the assembled male and female interlocking interfaces according to a preferred embodiment of the present invention;

FIGS. 6A and 6B are perspective views of collets to be used in the kit according to a preferred embodiment of the present invention;

FIGS. 8A and 8B are a perspective views illustrating a fastening operation of the collets to the ductwork elements according to a preferred embodiment of the present invention;

DETAILED DESCRIPTION OF PREFERRED EMBODIMENTS

Figure 1:
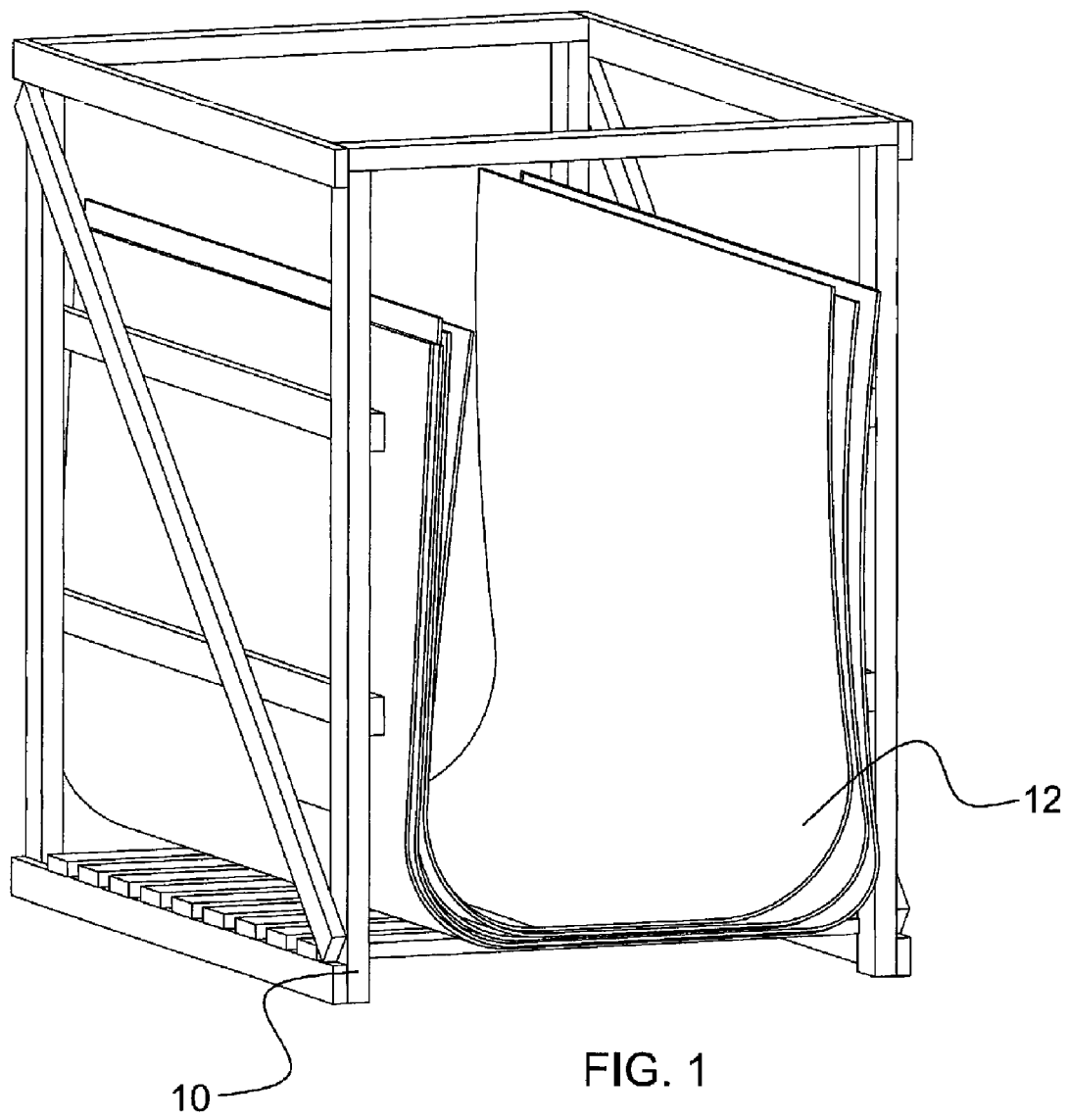
FIG. 1 is a perspective view of a pallet supporting a plurality of stacked flat flexible panels for a ventilation duct assembly kit according to a preferred embodiment of the present invention.

As shown in FIGS. 1 to 9B, the present invention provides a ventilation duct assembly kit for use for forming interconnecting ventilation ducts. The kit comprises, as shown in FIG. 1, a pallet 10 supporting a plurality of stacked flat flexible panels 12 that are shapeable into ductwork elements 14. As better shown in FIG. 2A, each of said flexible panels 12 comprises first and second opposite duct-forming sides 16,18, as well as first and second opposite interconnecting sides 20,22, for interconnection to a subsequent panel formed into a ductwork element. As better shown in FIG. 2B, the panel 12 also comprises a male interlocking interface 24 and a corresponding female interlocking interface 26 of a fastening system 28 respectively fixed on the first and second opposite 16,18 duct-forming sides for interlocking of the duct-forming sides 16,18 together upon shaping of the ductwork element. As better shown in FIGS. 3A to 3C, the kit also includes sealant 30 for sealing of the male 24 and female 26 interlocking interfaces after shaping of the ductwork element.

Figure 4:
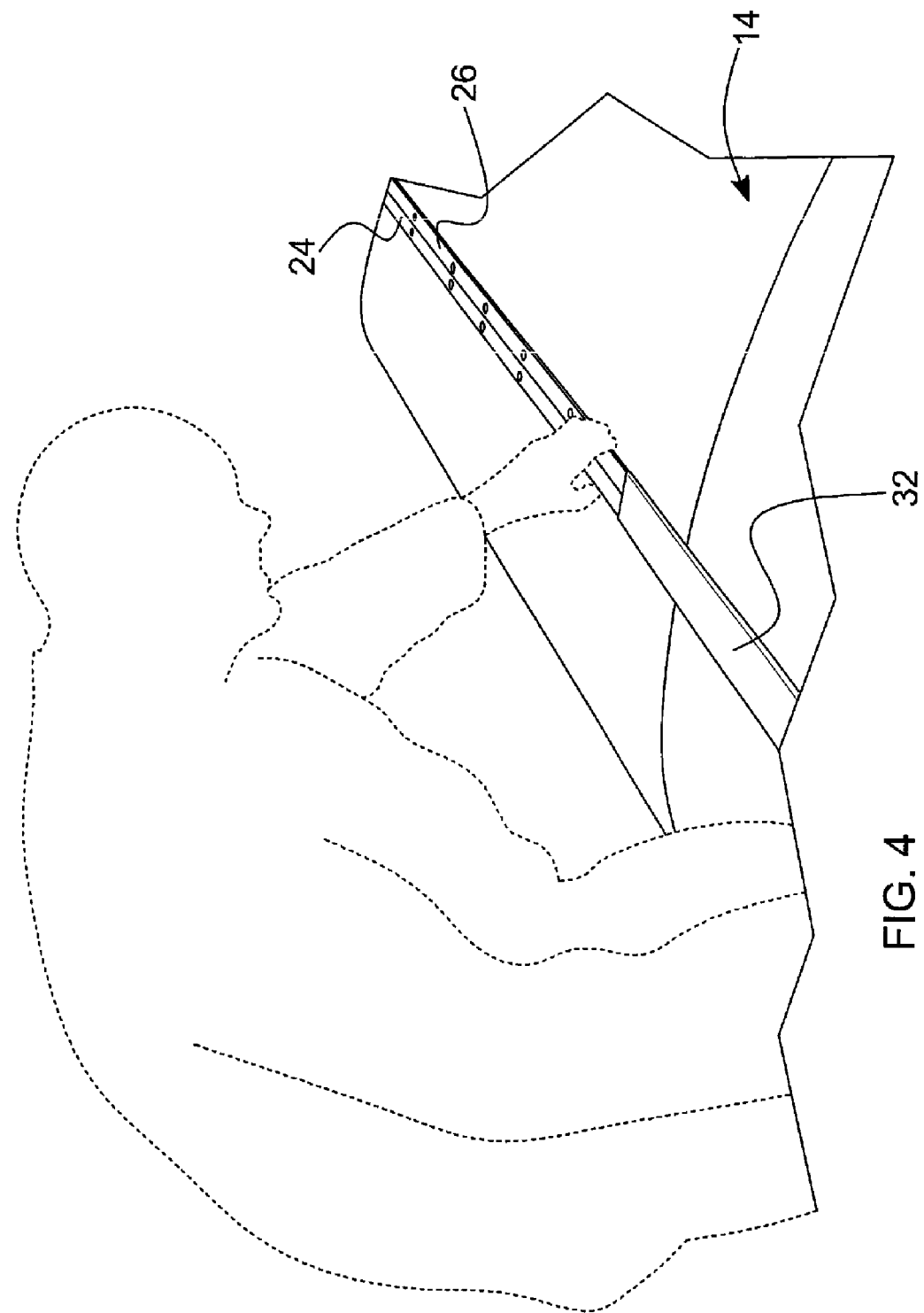
FIG. 4 is a perspective view of a slideable locking element according to a preferred embodiment of the present invention.

As better shown in FIG. 4, the kit also includes a plurality of slideable locking elements 32 shaped to slide and fit over assembled male and female interlocking interfaces 24,26 after shaping of the ductwork element 14.

As better shown in FIGS. 6A and 6B, the kit also includes a plurality of collets 34 shaped to fit over the interconnecting sides 20,22 of the formed ductwork elements 14 for interconnection of adjacent shaped ductwork elements 14. The collets 34 are sized to extend between the adjacent slideable locking elements 32 from corresponding adjacent shaped ductwork elements 14. The kit also includes a plurality of fasteners 34 for fastening the collets 32 to the shaped ductwork elements 14.

Preferably, as shown in FIG. 2B, the male interlocking interface 24 and a corresponding female interlocking interface 26, when assembled, form a generally trapezoidal structure with an even top surface 39. Thus the slideable locking elements 32 are shaped to fit and slide over this trapezoidal profile and top surface 39. Moreover, the male interlocking interface 24 preferably comprises a projection 40, shaped to fit in a corresponding groove 42 in the female interlocking interface 26.

Figure 5:
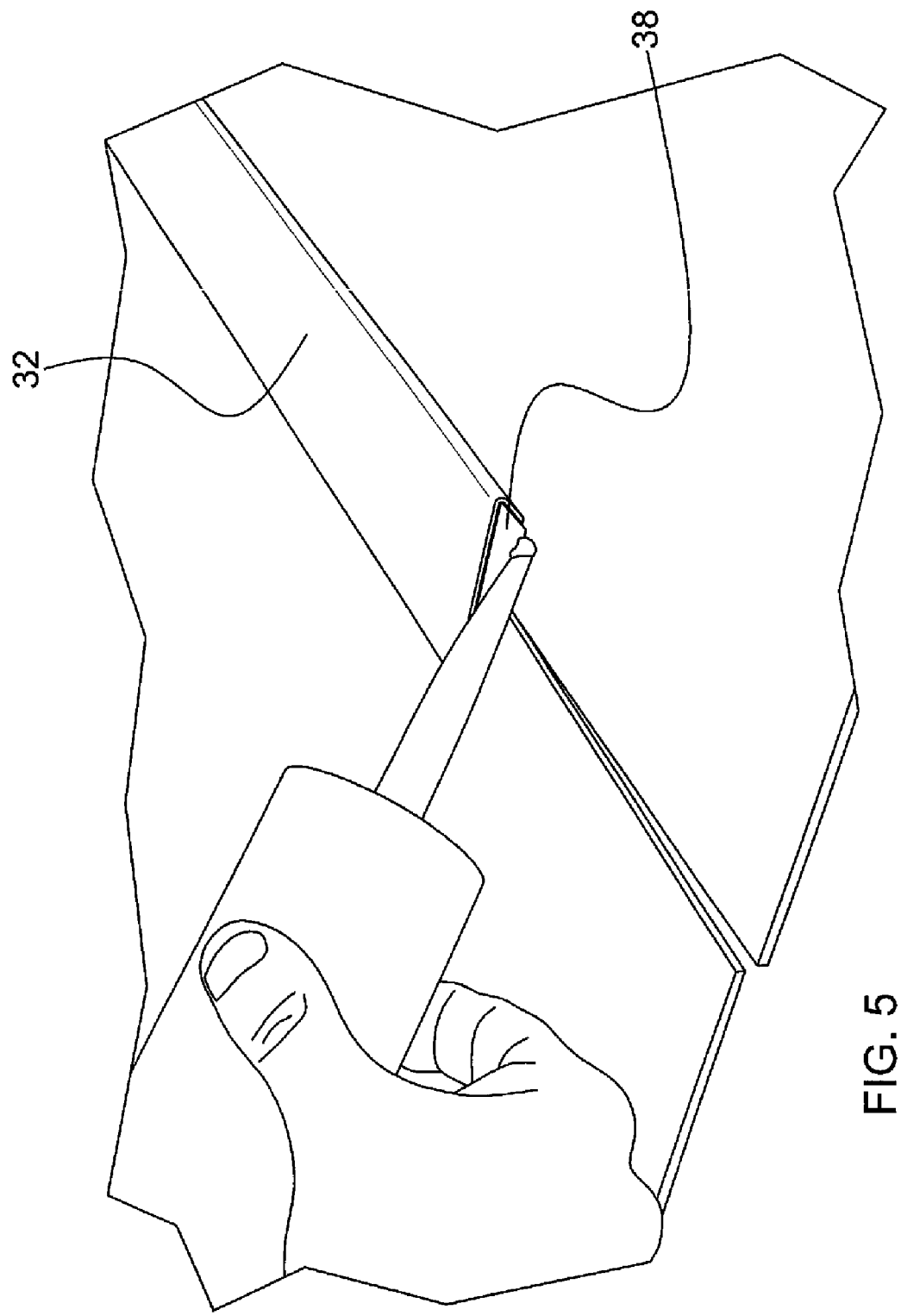
FIG. 5 is a perspective views illustrating a sealing operation of an extremity of the slideable locking element shown in FIG. 4.

The present invention also provides a method for assembling interconnecting ventilation ducts, the method comprising the steps of:

a) providing a ventilation duct assembly kit, as described above;

b) taking a flat flexible panel 12 and, as better shown in FIGS. 2A and 2B, placing the male interlocking interface 24 of said panel into the corresponding female interlocking interface 26 to form a ductwork element 14;

c) as better shown in FIGS. 3A to 3C, sealing an interface 36 between the assembled male interlocking interface 24 and the corresponding female interlocking interface 26 with the sealant 30;

d) as better shown in FIG. 4, sliding a slideable locking element 32 over the assembled male and female interlocking interfaces 24,26;

e) as better shown in FIG. 5, sealing the extremities 38 of the slideable locking elements 32 placed over the assembled male and female interlocking interfaces 24,26 with the sealant 30;

f) as better shown in FIGS. 6A and 6B, inserting a collet 34 over an interconnecting side of the formed ductwork element 14 until it contacts the slideable locking element 32;

g) inserting the collet 34 over an interconnecting side of an adjacent formed ductwork element 14 until it contacts the slideable locking element 32 of said adjacent formed ductwork element to interconnect the adjacent formed ductwork elements; and h) as better shown in FIGS. 8A and 8B, fastening the collet 34 to the adjacent formed ductwork elements 14 with fasteners 36.

Figure 7A:
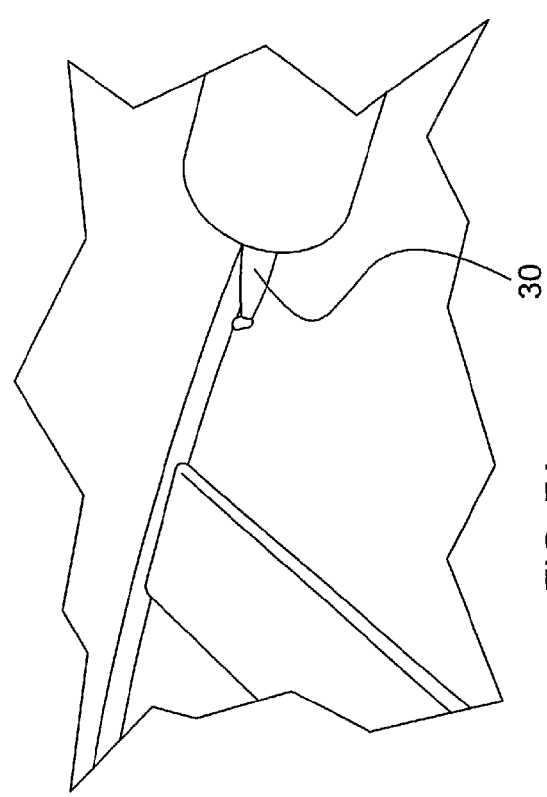
FIGS. 7A and 7B are a perspective views illustrating a sealing operation of the collets shown in FIGS. 6A and 6B.
Figure 7B:
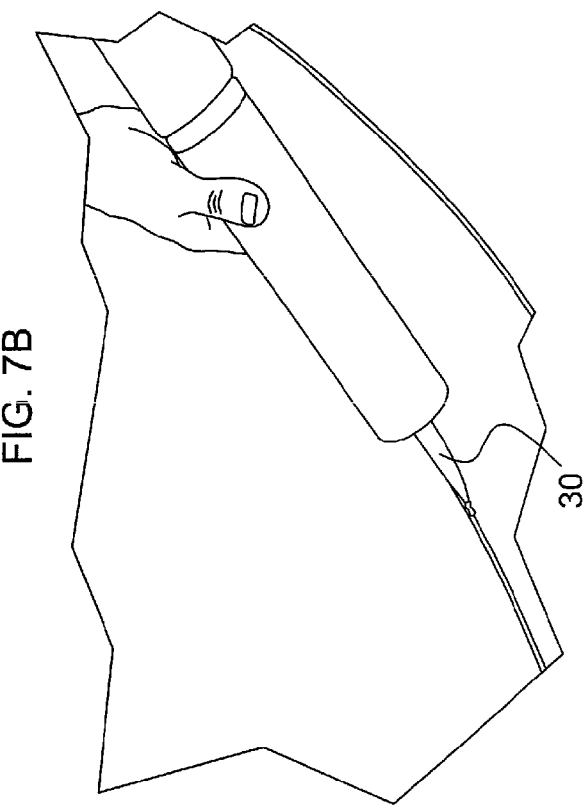

Preferably, as better shown in FIGS. 7A and 7B, before steps f) and g), sealant 30 is applied to the interconnecting sides of the formed ductwork elements 14 to properly seal the joint.

Figure 9A:
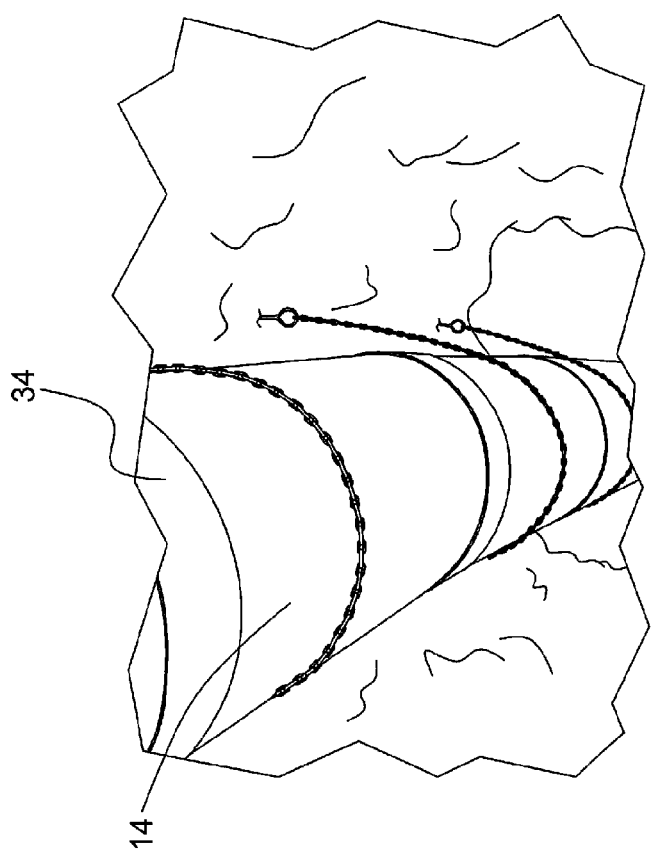
FIGS. 9A and 9B are perspective views showing assembled ductwork elements installed for use in a tunnel according to a preferred embodiment of the present invention.
Figure 9B:
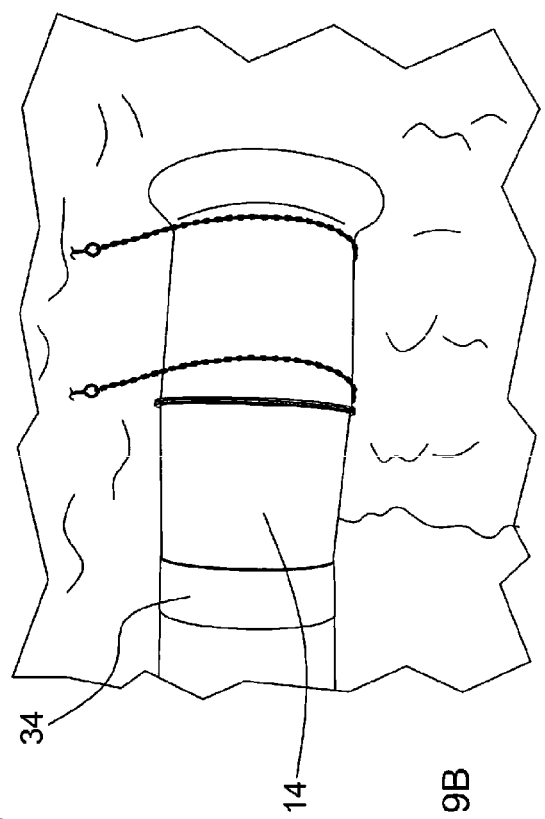

FIGS. 9A and 9B show the assembled ductwork elements installed for use in a tunnel.

The ventilation system made from the kit is preferably built in a factory or on site by specialized technicians. The ventilation system uses ducts made of products produced by Quadrant EPP such as HDPE (for the more-rigid interlocking interfaces) and copolymers (for the flexible panels). Such materials are chosen for their low friction coefficients, their great flexibility as well as their light weight depending on the application.

The ducts are developed with high performance equipment and tooling. The modern method of installing the ventilation system respects the capacity of the equipment on which the system is built-on. Required support equipment includes joining tools, numerical milling machines and manual extruders.

The following table shows results obtained with rigid ventilation ducts with slideable locking elements:

|  | October 20 | October 29 | November 3 | November 10 | November 24 |
|---|---|---|---|---|---|
| Beginning of ramp | 89485 CFM | 80216 CFM | 81687 CFM | 84358 CFM | 81694 CFM |
| After 178 m | 90860 CFM | 81420 CFM | 77880 CFM | 81892 CFM | 86544 CFM |
| After 250 m | 78771 CFM | 70091 CFM | 65751 CFM | 67704 CFM | 72261 CFM |
| After 333 m | — | — | 62985 CFM | 64753 CFM | 66963 CFM |
| After 411 m | — | — | — | — | 64170 CFM |
| Advancement (gallery in meters) | — | — | — | 437 m | 471 m |
| Static pressure (in psi) | 6.45 | 6.45 | 6.45 | — | 5.97 |

Note:
Results obtained with an L-shaped gallery measuring 4.3 m × 4.2 m.

Steps in Assembly of Duct

The text below provides further descriptions of the method for assembly of the interconnecting ducts according to a preferred embodiment of the present invention.

The first step, shown in FIGS. 2A and 2B, consists in assembling two separate parts of a panel 12 together. The male mounting element of the interlocking interface 24 is inserted in a groove 46 up to the bottom thereof (of the female interlocking interface 26).

Then, in step 2 shown in FIGS. 3A to 3C, a thin line of sealing material or caulking 30 (of the type Zip & Seal™) is spread on the middle of the male mounting element groove interface 39.

At step 3 shown in FIG. 4, a metallic slideable locking element 32 is slid on the interface assembly at one of the extremities thereof and another slideable locking element 32 is placed at the other extremity.

At step 4 shown in FIG. 5, a line of silicone or sealant 30 is then placed at both extremities of the slideable locking element 32.

At step 5 shown in FIGS. 6A and 6B, a junction collet 34 is then inserted over the interface assembly until the collet 34 rests against slideable locking elements 32.

In step 6 shown in FIGS. 7A and 7B, in order to provide a quality seal to the joints of the ducts, lines of silicone or sealant 30 are placed on the inner side and outer side of the ductwork elements.

In step 7 shown in FIGS. 8A and 8B, fasteners 36, such as support screws, are installed on the two collets 34 (preferably 8 to 10 screws per collet).

The above-mentioned assembly steps are repeated as required to form a length of the duct to be built.

In step 8 shown in FIGS. 9A and 9B, the assembled ductwork elements 14 can then be installed in a gallery or tunnel.

The ventilation ducts built from the kit according to the method of the present invention offers the following advantages:
- ease of assembly
- occupies very little space when descending underground (up to 30 ducts per pallet may be transported)
- very low friction coefficient (K factor)
- offers important energy savings
- very competitive price.

Tests have shown that the friction coefficient or K factor of ventilation ducts made from the kit in accordance with the present invention is generally in the range of 2.25 to 2.5, as opposed to K factors of 9 for steel ducts or 7 for fibreglass ducts. These lower friction coefficients in the ducts result in energy savings as fewer or less power-consuming ventilation systems are required to displace a same amount of air through the ducts.

Figure 10:
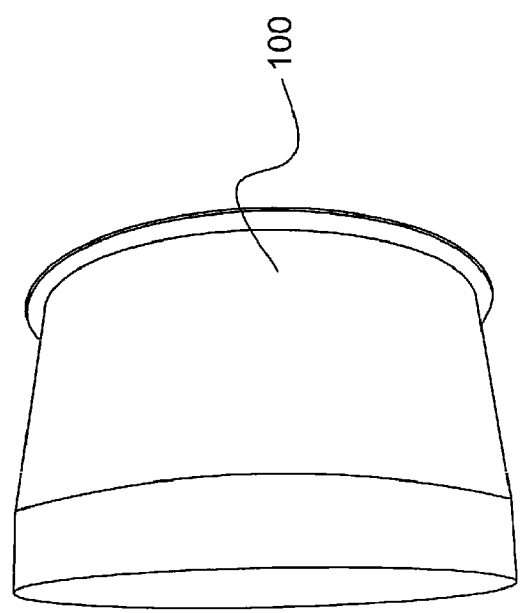
FIG. 10 is a perspective view of a nozzle accessory for use in conjunction with the kit according to a preferred embodiment of the present invention.
Figure 12:
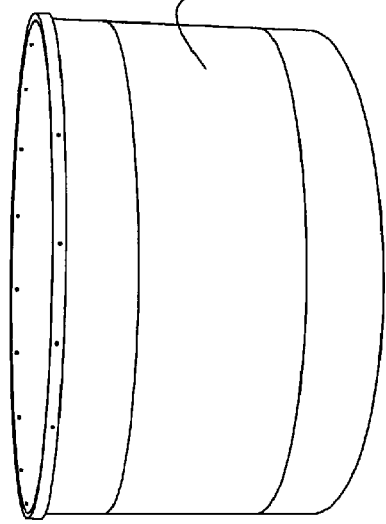
FIG. 12 is a perspective view of a collet accessory for use in conjunction with the kit according to a preferred embodiment of the present invention.
Figure 11:
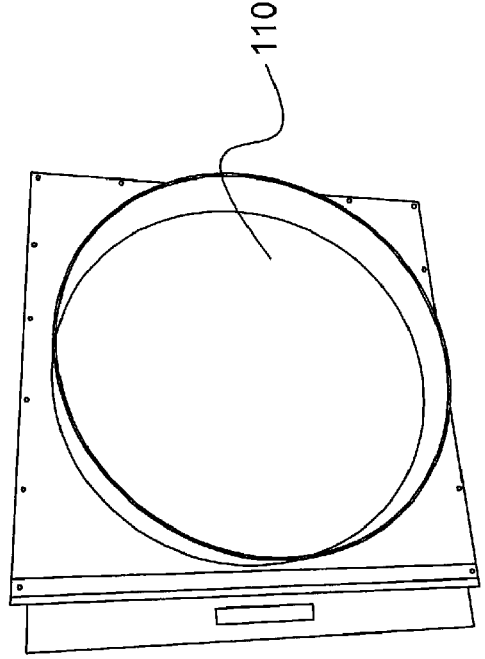
FIG. 11 is a perspective view of a guillotine valve accessory for use in conjunction with the kit according to a preferred embodiment of the present invention.
Figure 13:
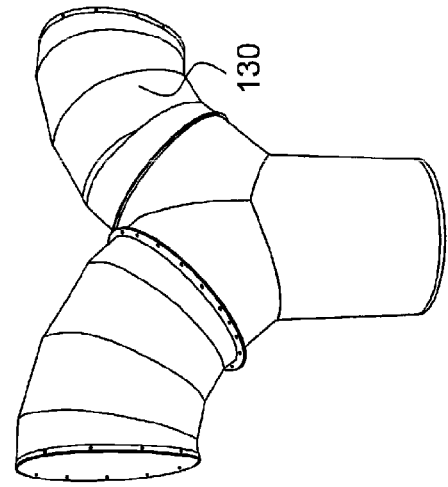
FIG. 13 is a perspective view of a Y-coupling accessory for use in conjunction with the kit according to a preferred embodiment of the present invention.
Figure 15:
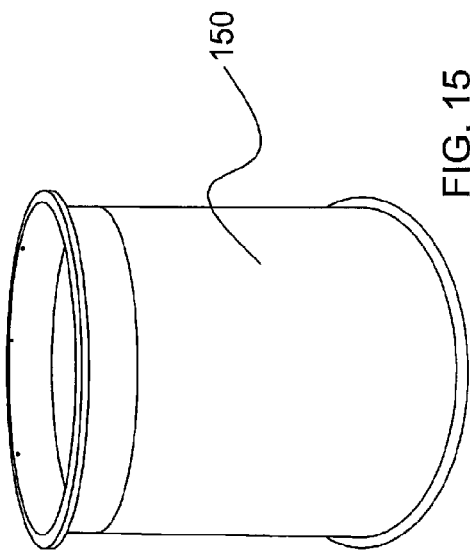
FIG. 15 is a perspective view of a reinforced pipe accessory for use in conjunction with the kit according to a preferred embodiment of the present invention.
Figure 14:
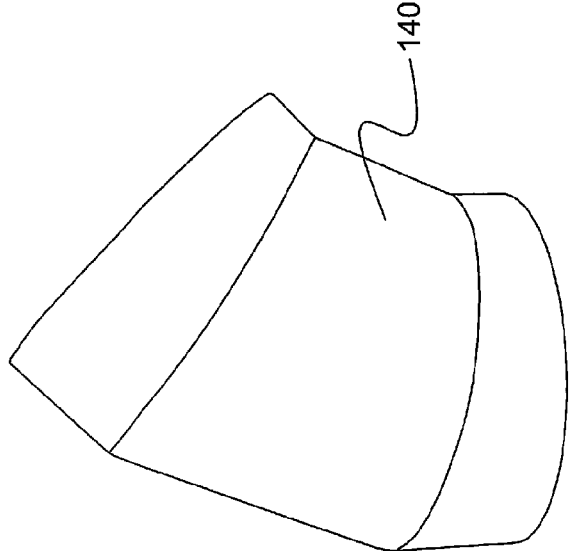
FIG. 14 is a perspective view of an elbow accessory for use in conjunction with the kit according to a preferred embodiment of the present invention.

In addition to the main duct elements, several other ventilation accessories are available to interface with the ductwork elements built according to the present invention. These accessories include, among others:
- nozzles 100 (as shown in FIG. 10)
- guillotine valves 110 (as shown in FIG. 11)
- standard and demountable junction collets 120 (as shown in FIG. 12)
- T and Y couplings 130 (as shown in FIG. 13)
- 22.5, 45 or 90 degrees elbows 140 (as shown in FIG. 14)
- reinforced pipes 150 (as shown in FIG. 15)

Of course, other types of accessories that can be made or sized to be compatible with the ductwork elements according to the present invention may also be provided.

Using the kit according to the present invention, approximately 120 feet of ductwork can be installed in a day. Moreover, typically the equivalent 800 to 1000 feet of ductwork can be carried in a single trailer, which facilitates transportation of the materials to installation sites.

Although preferred embodiments of the present invention have been described in detailed herein and illustrated in the accompanying drawings, it is to be understood that the invention is not limited to these precise embodiments and that various changes and modifications may be effected therein without departing from the scope or spirit of the present invention.

The invention claimed is:

1. A ventilation duct assembly kit for use for forming interconnecting ventilation ducts, the kit comprising;
   a pallet supporting a plurality of stacked flat flexible panels that are shapeable into ductwork elements, each of said flat flexible panels comprising:
      first and second opposite duct-forming sides;
      first and second opposite interconnecting sides for interconnection to a subsequent panel formed into a ductwork element; and
      a male interlocking interface and a corresponding female interlocking interface of a fastening system respectively fixed on the first and second opposite duct-forming sides for interlocking of the duct-forming sides together upon shaping of the ductwork element;
   a sealant for sealin of the male and female interlocking interfaces after shaping of the ductwork element;
   a plurality of slideable locking elements shaped to slide and fit over assembled male and female interlocking interfaces after shaping of the ductwork element;
   a plurality of collets shaped to fit over the interconnecting sides of the formed ductwork elements for interconnection of adjacent shaped ductwork elements, and sized to extend between the adjacent slideable locking elements from corresponding adjacent shaped ductwork elements; and a plurality of fasteners for fastening the collets to the shaped ductwork elements.

2. The ventilation duct assembly kit according to claim 1, wherein the female interlocking interface comprises a groove, the male interlocking interface comprises a projection shaped to fit in the corresponding groove of the female interlocking interface.

3. The ventilation duct assembly kit according to claim 2, wherein the male and female interlocking interfaces form a generally trapezoidal structure with an even top surface when said interfaces are assembled together.

4. The ventilation duct assembly kit according to claim 3, wherein the flexible panels are made of a copolymer.

5. The ventilation duct assembly kit according to claim 4, wherein the male interlocking interface and the female interlocking interface are made of high density polyethylene.

6. The ventilation duct assembly kit according to claim 3, wherein the male interlocking interface and the female interlocking interface are made of high density polyethylene.

7. The ventilation duct assembly kit according to claim 2, wherein the flexible panels are made of a copolymer.

8. The ventilation duct assembly kit according to claim 2, wherein the male interlocking interface and the female interlocking interface are made of high density polyethylene.

9. The ventilation duct assembly kit according to claim 1, wherein the flexible panels are made of a copolymer.

10. The ventilation duct assembly kit according to claim 1, wherein the male interlocking interface and the female interlocking interface are made of high density polyethylene.

* * * * *

UNITED STATES PATENT AND TRADEMARK OFFICE
CERTIFICATE OF CORRECTION

| | |
|---|---|
| PATENT NO. | : 8,336,925 B2 |
| APPLICATION NO. | : 12/550702 |
| DATED | : December 25, 2012 |
| INVENTOR(S) | : Andre Paquet and Cristian Paquet |

It is certified that error appears in the above-identified patent and that said Letters Patent is hereby corrected as shown below:

On the first page of the Patent, (73) Assignee: Please delete "Mecanincad Inc.," and replace with -- Mecanicad Inc. --

Signed and Sealed this
Nineteenth Day of February, 2013

Teresa Stanek Rea
*Acting Director of the United States Patent and Trademark Office*